Oct. 5, 1948.   J. H. GALLEY ET AL   2,450,653
RECIPROCATING EXPANSIBLE CHAMBER WINDSHIELD WIPER
MOTOR WITH SHAFT OPERATED SNAP ACTION
DISTRIBUTING VALVE PLUNGERS
Filed Aug. 9, 1944                                    3 Sheets-Sheet 1

INVENTORS
JOHN H. GALLEY
LEROY J. CAREY
BY George M. Soule
ATTORNEY

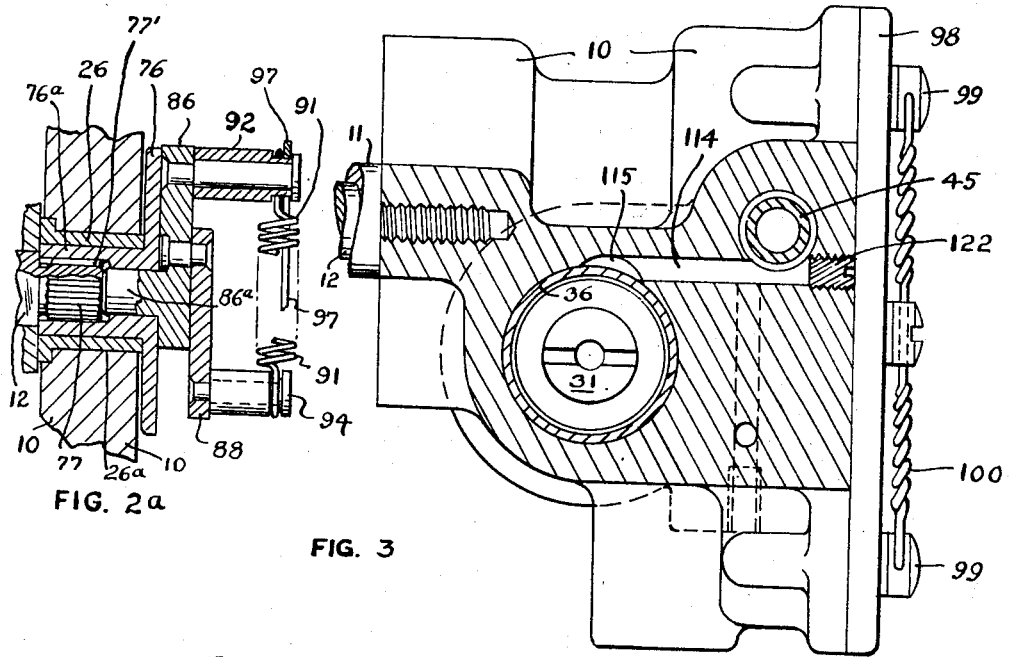
FIG. 2a
FIG. 3
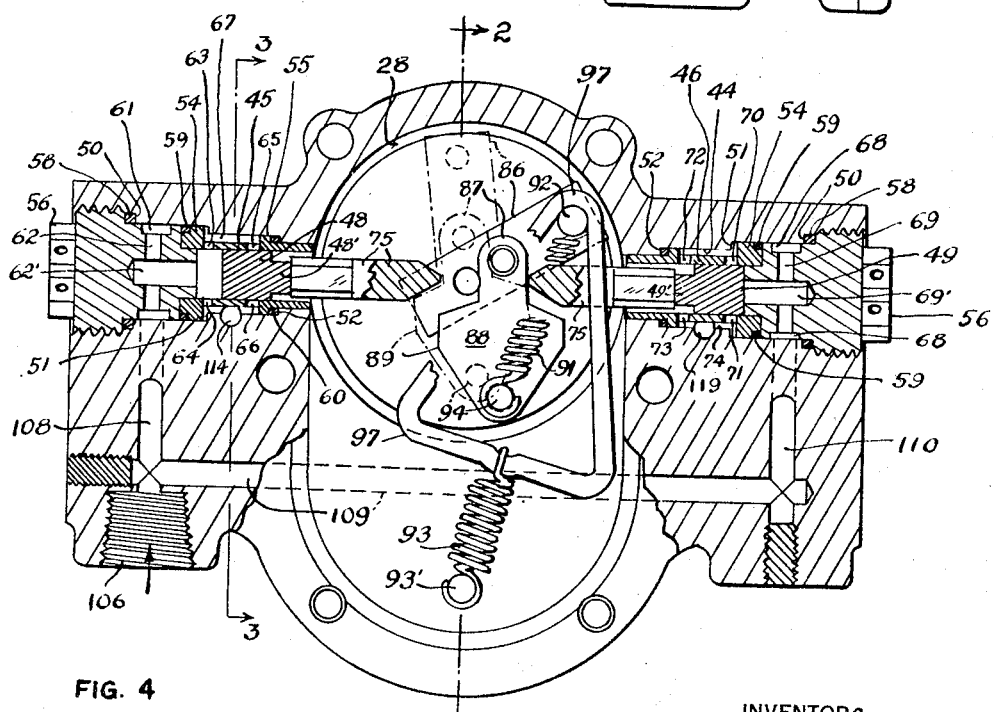
FIG. 4
INVENTORS
JOHN H. GALLEY
LEROY J. CAREY
ATTORNEY Oct. 5, 1948.    J. H. GALLEY ET AL    2,450,653
RECIPROCATING EXPANSIBLE CHAMBER WINDSHIELD WIPER
MOTOR WITH SHAFT OPERATED SNAP ACTION
Filed Aug. 9, 1944    DISTRIBUTING VALVE PLUNGERS
3 Sheets-Sheet 3

INVENTORS
JOHN H. GALLEY
LEROY J. CAREY
BY
ATTORNEY

Patented Oct. 5, 1948

2,450,653

UNITED STATES PATENT OFFICE 2,450,653

RECIPROCATING EXPANSIBLE CHAMBER WINDSHIELD WIPER MOTOR WITH SHAFT OPERATED SNAP ACTION DISTRIBUTING VALVE PLUNGERS

John H. Galley, Los Angeles, Calif., and Leroy J. Carey, Cleveland, Ohio, assignors to The Marquette Metal Products Company, Cleveland, Ohio; a corporation of Ohio Application August 9, 1944, Serial No. 548,692

18 Claims. (Cl. 121—164)

This invention relates to fluid operated motors and more particularly to a fluid operated motor of the reciprocating type which is useable, for example, as the prime mover of a window or windshield wiping mechanism. This application is a continuation-in-part of our copending application, Serial No. 508,330, filed October 30, 1943, now abandoned.

The motor is designed primarily for driving windshield wipers on aircraft and meets the many exacting requirements of such installations. For example, the torque output is large in relation to the size and weight of the motor and the efficiency is high so that fluid consumption is very low. The motor may be readily manufactured from the metals or alloys normally used in aircraft construction, for example, non-magnetic, and has a minimum of moving parts permitting it to be economically manufactured and easily maintained in properly operating condition.

One of the disadvantages of many prior motors designed for similar applications is their inability to operate positively and efficiently and for long periods both when supplied with operating fluid under extremely high pressure and when supplied with relatively low pressure fluid. Relatively high pressure hydraulic fluid is used on modern aircraft for general accessory operation and most prior fluid operated motors designed for aircraft windshield wiping have had to be made fairly large and therefore heavy in order to withstand the strains to which they were subjected.

Reduction in size and weight is attained in accordance with the present invention by the provision of an improved motor of such construction that it is capable of operating positively and safely for long periods when supplied with fluid at very high pressure as well as being capable of positive operation at considerably lower pressures. Although hydraulic fluid is contemplated as the operating medium, the motor may be driven by air or other gaseous fluid.

The ability of the motor to operate efficiently is, in part, a result of a novel actuating mechanism for sleeve or plunger and cylinder type valves and the increased ruggedness is due, in part, to an improved sleeve valve, the manner in which the valve cooperates with the main power piston, an improved snap action mechanism for operating the valves, and an improved piston and cylinder construction.

Another disadvantage of fluid operated motors when used for driving windshield wipers has been the lack of simple means for readily adjusting the angular sweep of the wiper blade or blades. Improved adjustment features are provided in the motor of this invention and thus identical motors can be installed in positions requiring different ranges of movement on part of the ultimate operating device such, for example, as a wiper blade.

An object of this invention is to provide a new and/or improved fluid motor.

Another object is to provide a motor capable of operating at high efficiency when supplied with extremely high pressure fluid as well as when supplied with relatively low pressure fluid.

A further object is to provide an improved valve mechanism for a fluid operated motor.

Still another object is to provide a fluid motor having an improved reversing or snap action toggle mechanism for operating a fluid control valve means.

A still further object is to provide a fluid motor having a power take-off shaft driven with alternate rotary motion and including improved means operable for adjustably varying the degree of oscillating movement of the shaft both in overall extent and, if desired, with respect to a preselected position of reference.

Other objects include the provision of an adjustable packing means around the power take-off shaft of a fluid operated motor and the provision of a novel, double-spring, snap action toggle mechanism for operating an automatic reversing fluid control valve means.

Other objects and advantages will become apparent from the following description wherein reference is made to the drawings in which:

Fig. 2a is a fragmentary sectional view generally similar to the right hand portion of Fig. 2 and showing a modification in the construction of the snap action toggle mechanism;

Fig. 3 is a sectional view taken generally as indicated by the line 3—3 of Figs. 4 and 5;

Figure 2:
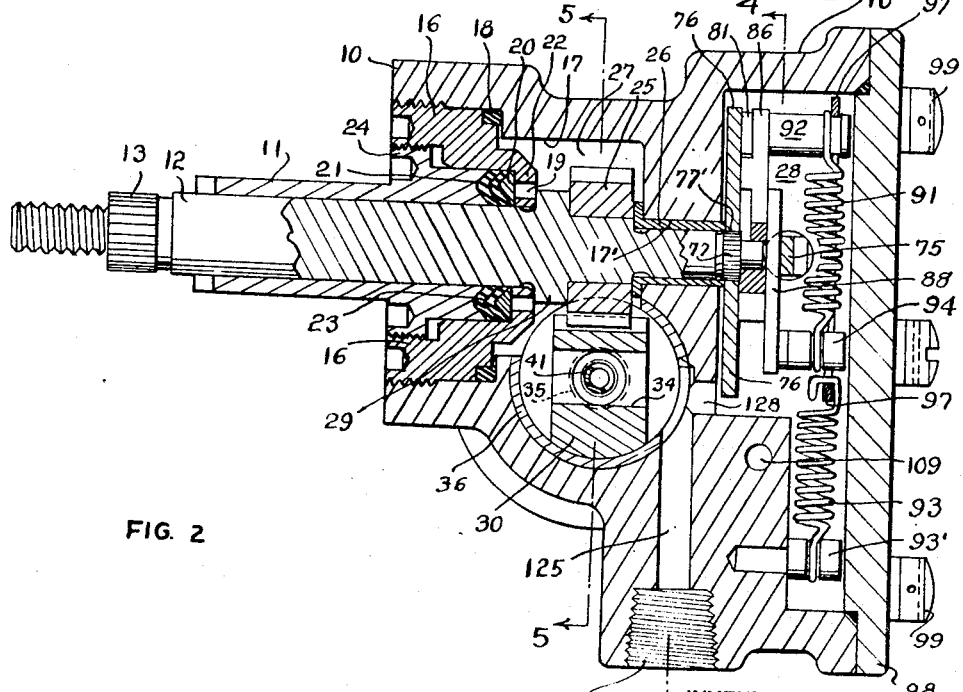
Fig. 2 is a sectional view taken generally as indicated by the line 2—2 of Fig. 4.
Figure 5:
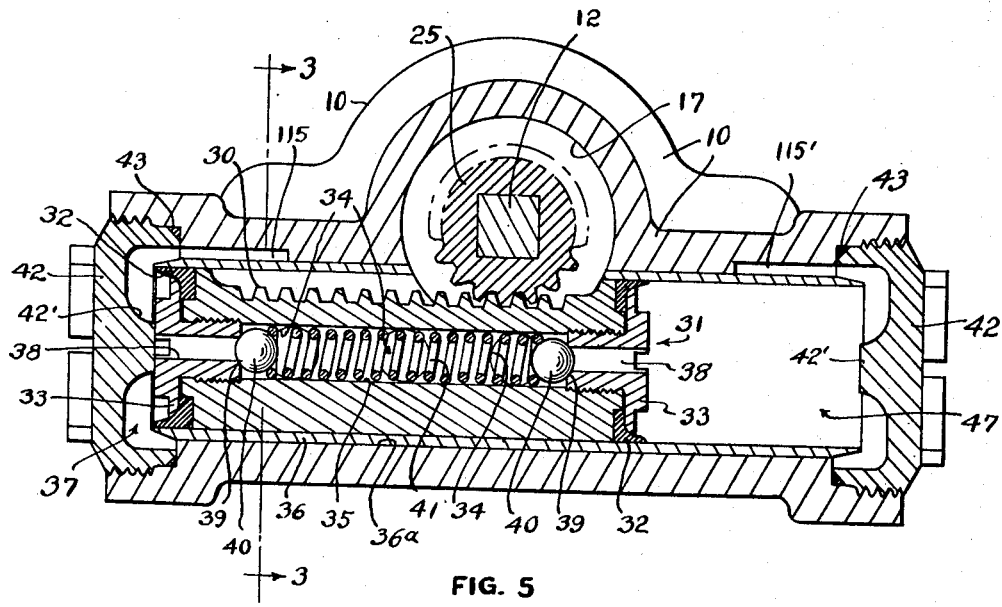
Figures 6, 7:
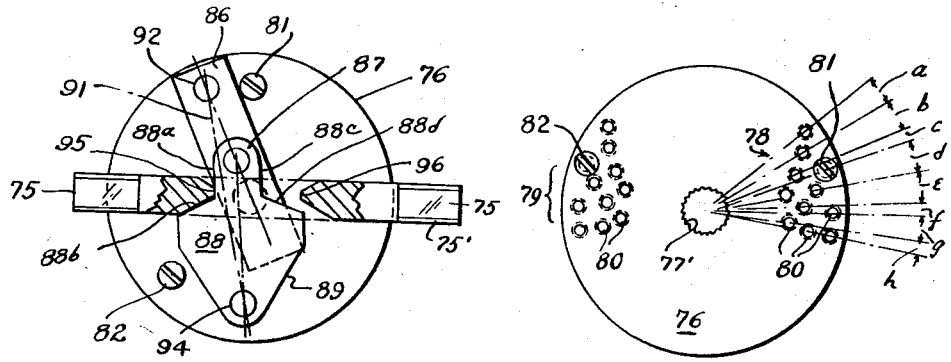

Figs. 4 and 5 are sectional views taken generally as indicated by the lines 4—4 and 5—5, respectively, of Fig. 2;

Fig. 6 is a detail view of the snap action mechanism in a transitory operating position, and Fig. 7 is a detail view showing a stroke adjustment feature of the invention.

The motor operates properly in any turned position, hence such terms as front and rear, left and right, are not to be considered restrictive in any sense.

Referring to the drawings, a housing for the motor comprises a body member 10 which may be a cored casting or die casting of any of the light non-ferrous metals, or, for further example, a plastic molding, suitably formed or bored to accommodate the working parts. The body 10 is irregularly shaped providing a minimum of wall thickness throughout so as to render the motor fairly light in weight.

Figure 1:
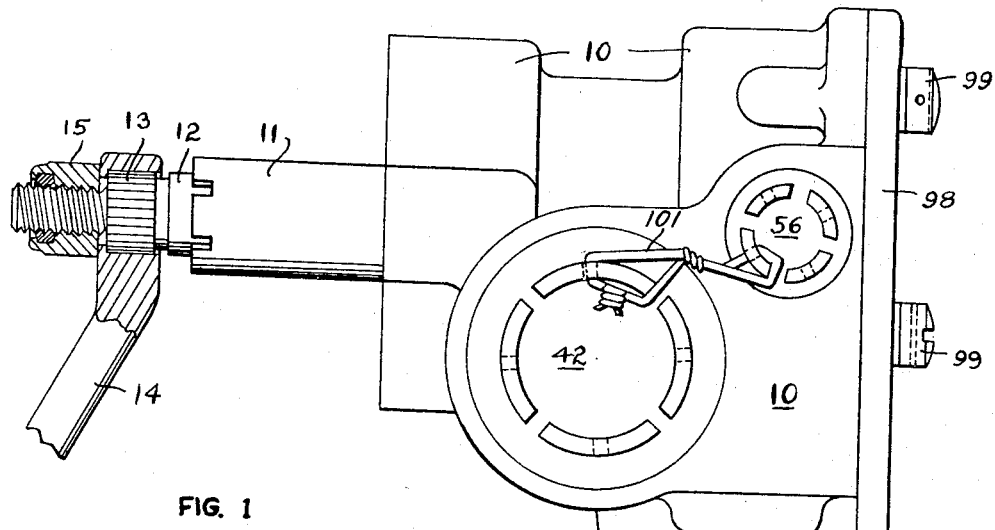
Fig. 1 is a side view partly in section showing the motor connected to a windshield wiper drive arm.

A bushing 11, Figs. 1 and 2, rotatably supports a power take-off shaft 12 which has a splined or longitudinally serrated outer end portion 13 to which is secured a windshield wiper drive arm 14 (Fig. 1) as by a lock nut 15 threaded on the end of the shaft. In order to provide for adjustment of the seal around the shaft 12, an integral flange 24 of the bushing 11 is adjustably received as by a threaded joint in a collar or mounting sleeve 16 which, in turn, is adjustably received in a tapped counterbored portion of a circular opening 17 in the body 10. An elastic packing ring 18 received in a shouldered portion of the collar 16 is compressed against the base of the counterbore as the collar is screwed into position. A metal washer 20 of triangular section and chevron type annular packing rings 21 are interposed between an inwardly turned flange 22 of the collar 16 and a concave inner surface portion 23 of the bushing 11. Spanner wrench openings provided in the front faces of the flange 24 and of the collar 16 permit ready adjustment between the relative positions of the bushing 11, the collar 16 and the body 10 to vary the compression of the packings 18 and 21 without requiring disassembly of the motor to enable such adjustments. Openings 19 in the flange 22 enable the packing assembly (20, 21) to be readily removed from the collar 16 when said collar, bushing 11 and the power take-off shaft are removed from the housing and disassembled.

The innermost portion of the opening 17 defines a working space 27 for a pinion 25 mounted on non-circular (e. g. squared) portion of the shaft 12. An inner reduced diameter circular portion of the shaft 12 is rotatably supported in a flanged bushing 26 pressed into a reduced extension 17' of the opening 17. The shaft extends beyond the bushing into a cylindrical recess 28 in the rear face of the body 10. Axial movement of the shaft 12 in one direction is prevented by an integral flange 29 of the shaft which bears against the inner face of the flange 22 of the collar 16 and in the opposite direction by the pinion 25 which bears against the flange of the bushing 26.

The pinion 25 is in constant mesh with the teeth of a rack member 30 forming a part of a piston assembly 31 (Fig. 5). The piston assembly 31 also comprises a pair of flexible sealing cups 32 held in position by piston heads 33 threaded into respective opposite ends of an axial bore 35 through the rack member 30. A plurality of spaced, transverse bores 34 through the rack member 30 intersect the bore 35 and are open to a region at atmospheric pressure (outlet 125, Fig. 2, described later). The piston assembly 31 is slidably received for reciprocation within a piston receiving sleeve 36 of stainless steel or other high strength alloy pressed into a transverse cylinder bore 36a in the body 10 intersecting the opening 17. The piston heads 33 have central axial bores 38, respectively, which are aligned with the bore 35 and which define valve seats 39 complementary to a pair of ball valves 40 normally held in seated position thereon by a helical spring 41 interposed between the balls. The rack member 30 of the piston, intermediate of its ends, is of generally square cross section having a toothed upper surface but having a curved lower surface and completely circular end portions complementary to the inner wall of the piston sleeve 36 as shown by Figs. 2 and 5. The cylinder bore is sealed by internally recessed castellated plugs 42, threaded into opposite counterbored ends, respectively, of the bore 36a and having inner chamfered portions bearing against and compressing annular elastic packings 43, respectively, seated on shoulders defined by the bottoms of the counterbores. Piston chambers 37 and 47 are thereby formed at opposite ends of the piston assembly 31. Central bosses 42' in the internal recesses of the plugs 42 serve as stops for the piston assembly 31 when the motor mechanism is adjusted for maximum stroke operation.

Referring to Fig. 4, a pair of coaxial valve bores 44 in the body 10 parallel to and above the cylinder bore and opening into the recess 28 respectively receive a pair of flanged valve guides in the form of sleeves 45 and 46. The valve assembly additionally comprises a pair of valve plungers 48 and 49 slidably received for reciprocation in the sleeves 45 and 46, respectively. The valve plungers are in a sense free floating although caused to move simultaneously in opposite directions as though interconnected. Each of the bores 44 has four portions of progressively smaller diameter inwardly of the housing 10 which define three spaced shoulders 50, 51 and 52 in each bore and each of the valve sleeves 45 and 46 has outwardly projecting spaced annular flanges 54 and 55 intermediately of its ends. The outermost portions of the bores 44 are threaded to receive respective castellated plugs 56, reduced inner ends of which are piloted within the respective valve sleeves 45 and 46 to assist in holding the sleeves in coaxial relationship and centered in the respective bore portions which receive the sleeves. Elastic ring packings 58 are compressed between shouldered portions of the plugs 56 and the shoulders 50 of the bores 44, respectively, and similar packings 59 are interposed between inner faces of the plugs 56 and the flanges 54 of the sleeves, respectively. In addition, elastic ring packings 60 are inserted between the flanges 55 of the valve sleeves and the respective bore shoulders 52. The machining dimensions between the plugs 56 and the respective valve sleeves 45 and 46 are such that before metal to metal contact therebetween occurs the packings 59 are squeezed out or extruded against the walls of the respective bores 44, and the packings 60 are made thick enough so that they are compressed a considerable amount at the same time that the packings 59 are compressed. Thus by merely screwing the plugs 56 into position, the sleeves 45 and 46 are properly positioned and the bores 44 sealed against fluid leakage.

An annular chamber 61 defined by a circumferential groove in the left hand plug 56 (Fig. 4) communicates with the interior of the valve sleeve 45 through radial passages 62 and an axial passage 62' in the plug 56. A pair of diametrically opposed ports 63 and 64 and a similar pair of ports 65 and 66 permit fluid to flow between the interior of the sleeve 45 and a chamber 67 defined by the annular space around the sleeve 45 between the flanges 54 and 55. Similarly, an annular chamber 68 defined by a circumferential groove in the right hand plug 56 (Fig. 4) communicates with the interior of the sleeve 46 through radial passages 69 and an axial passage 69' in the plug; and ports 70, 71, 72 and 73, which correspond to the ports 63, 64, 65 and 66, respectively, permit fluid to flow between the interior of the sleeve 46 and a chamber 74 defined by the annular space around the sleeve 46, end walls for which space are formed by the flanges 54 and 55 of the valve sleeve 46. The valve plungers 48 and 49 each have respective inner portions 48' and 49' of reduced diameter adapted to cooperate with a valve actuating push rod 75 and associated snap action mechanism (described later), which mechanism is operated directly by the inner end or tail portion of the drive shaft 12.

A longitudinally serrated inner end portion 77 of the drive shaft 12 (Figs. 2 and 7) extends into the recess 28 and supports in adjusted turned positions an index or drive plate 76 having a central splined (serrated) opening 77' fitting the drive shaft, and a pair of groups 78 and 79 of tapped holes or sockets 80. A drive pin 81 for the snap action mechanism is adapted to be threaded into a selected one of the holes 80 in the group 78, and a similar drive pin 82 is adapted to be threaded into a selected one of the holes 80 in the group 79. Rotary movement of the shaft 12 causes turning of the plate 76 so that one or the other of the drive pins 81 and 82 strikes a toggle arm 86 rotatably supported on a reduced end portion of the shaft 12 and freely turnable on said end portion.

The drive plate 76, if removed from the serrated end 77 of the drive shaft 12 and replaced in a different turned position on the serrations of the shaft, will cause the wiper drive arm 14 to operate over a field centered at one side of the unit (e. g. reference plane of line 2—2 on Fig. 4). Similar adjustment of the drive arm on the serrations at the outer end of the drive shaft will likewise change the field of wiping operation, and ordinarily the latter adjustment is all that is required in order properly to center the wiper blade for operation over the desired field. The number of serrations which may be formed on either end of the shaft is limited by machining capabilities and tooth strength factors; but by spacing the serrations at one end of the shaft through angles dissimilar to those at the opposite end, the adjustability for centering the wiper on the desired field is greatly increased. For example, with 36 serration teeth at 13 on the larger end of the shaft and 24 teeth at 77 the adjustment enabled between the drive arm 14 and the drive plate 76 is at 5° increments.

The toggle or snap action mechanism includes an upwardly extending tongue portion 87 of a cam 88, which latter is pivoted at its upper end to the arm 86 near the longitudinal center of said arm. The edges of the tongue portion 87 and the top of the main body of the cam define angularly disposed cam or shoulder surfaces 88a and 88b on one side of the cam and cam or shoulder surfaces 88c and 88d on the other side. The cam has parallel side edges below the surfaces 88b and 88d and has a lower triangular portion 89.

The arm 86 and the cam 88 are normally held in the right hand position shown by solid lines in Fig. 4 (or in a similar left hand position) due to the combined bias of a helical tension spring 91 suitably secured at opposite ends to pins 92 and 94, respectively, and of a similar spring 93 secured at its lower end to a fixed pin 93' received in a socket in the body 10 and at its upper end to the mid-point of a lower leg of a triangular hollow link 97. The link 97 has its upper vertex received adjacent the upper end of the spring 91 in an annular groove formed near the outer end of the pin 92. The pins 92 and 94 are suitably secured to and project rearwardly from the free end of the arm 86 and the lower end of the cam 88, respectively. The drive pins 81 and 82 are purposely omitted from the solid line showing of Fig. 4 to avoid confusion with other parts illustrated. Both drive pins are shown on Figs. 6 and 7.

The push rod 75, shown (Fig. 2) as generally square in cross section, extends diametrically across the recess 28 and has its opposite ends slidably guided and supported, as at rounded corner portions 75' of the rod, in the inner ends of the valve guide bores of the valve sleeves 45 and 46, respectively. Space for free flow of operating fluid axially of the push rod 75 in either direction within the valve guide bores is provided by forming the rod as just described. A central cutaway portion on the inner side of the push rod 75 provides space for the cam 88 and defines somewhat pointed shoulders 95 and 96 (Figs. 4 and 6) adapted to be engaged by the cam surfaces 88a and 88b and by the cam surfaces 88c and 88d, respectively.

The modified toggle mechanism construction according to Fig. 2a is the same in the general principles as that described above except that both the drive plate 76 and the toggle arm 86 are supported in a manner better to resist movement of those parts out of their planes of oscillating movement. As shown in Fig. 2a the drive plate 76 has a hub portion 76a journalled at 26a in the bushing 26 and the toggle arm 86 has a cylindrical pivot-forming extension 86a which turns freely in a smooth cylindrical bore portion of the hub 76a beyond the serration teeth 77' of said hub. By virtue of the modified construction the pivotal support for the toggle arm can be made longer and larger without waste of space and the drive plate is adequately supported independently of the spline connections between it and the drive shaft 12.

A cover plate 98 (Fig. 2) for the recess 28 is secured to the body 10 as by cap screws 99 which may be held against loosening by tie-wires 100, similar wires 101 (Fig. 1) being provided to retain the castellated plugs 42 and 56 in sealed position.

Operating fluid under pressure may enter the motor through an inlet port 106 (left, Fig. 4) which communicates with a vertical passage 108 extending to the chamber 61 around one of the plugs 56. A horizontal passage 109 intersects the passage 108 and extends to the other side of the motor where it intersects a vertical passage 110.

A passage 114 (Figs. 3 and 4) extends from the chamber 67 to an axial groove 115 (Figs. 3 and 5) in the wall which contains the cylinder-forming sleeve 36. The groove 115 opens into an outer enlarged portion of the piston chamber 37 which is defined by the recess in the inner face of the left hand plug 42 (Fig. 5). Similarly, a passage 119 (Fig. 4 only) extends from the chamber 74 to an axial groove 115' which opens into an outer enlarged portion of the piston chamber 47 defined by the recess in the inner face of the right hand plug 42. The outer end of the passage 114 may be sealed by a plug 122 (Fig. 3), and a similar plug (not shown) seals the outer end of the passage 119.

In event either of the balls 40 is unseated, as by extremely high pressure in one or the other of the piston chambers 37 or 47, fluid flows into the axial bore 35 of the piston, out of the transverse bores 34 and thence through a passage 125 (Fig. 2) to a discharge port 126 whereby the internal pressure is relieved. A safety valve means is thus provided which prevents extremely high pressure fluid from causing damage to the motor or the apparatus driven thereby. Discharge fluid received in the recess 28 containing the snap action mechanism earlier described flows freely from said recess through a short bottom drain passage 128 (Fig. 2) into the passage 125 and thence to the discharge port 126.

In considering the operation of the motor, the moving parts are assumed to be initially in the position in which shown by Figs. 4 and 5.

Operating fluid supplied in a suitable manner to the inlet port 106, Fig. 4, flows through the passage 108, the annular chamber 61, the passages 62 and 62', the interior of the valve sleeve 45 at the left of the valve plunger 48, through the ports 63 and 64, the chamber 67 and the body passages 114 and 115 and finally to the piston chamber 37 at the left of the piston assembly 31 as viewed in Fig. 5. Concurrently, fluid enters the passages 109 and 110 and flows through the annular chamber 68 and the passages 69 and 69' into the interior of the valve sleeve 46 to the right of the valve plunger 49 (Fig. 4) where it becomes static since the ports 70 and 71 are closed by the valve plunger 49 which is held in the position shown by the push rod 75 and the toggle mechanism.

The high pressure fluid in the piston chamber 37 forces the piston assembly 31 to the right from the position in which shown, and the rack teeth drive the pinion 25 counterclockwise (Fig. 5) to effect rotary movement of the shaft 12 and the wiper drive arm 14.

Rotation of the shaft 12 counterclockwise as shown in Fig. 5 rotates the index or drive plate 76 counterclockwise as shown in Figs. 4, 6 and 7 to cause the drive pin 81 to rotate the toggle arm 86 counterclockwise from the position shown by the solid lines in Fig. 4 against the combined bias of the springs 91 and 93 to the position shown by the broken lines in the same figure. It will be noted that said broken line position is the dead center position of the spring 91, but that said position is slightly beyond the dead center position of the spring 93. The cam 88 is raised and shifted to the left as indicated by said broken lines during this portion of the movement of the arm 86, but the cam surface 88a is not yet in contact with the end of the pointed shoulder 95 of the push rod 75. However, the corner at the outer end of the cam surface 88d is now in sliding contact with the lower beveled surface of the pointed shoulder 96 of the push rod 75 so that the latter still holds the valve plunger 49 in the initial position shown. Although the pressures on the two valve plungers tending to force the plungers toward the push rod 75 are balanced, it should be observed that a slight difference in working clearance between the valve plungers and their guide bores or foreign matter in the operating fluid would cause one of the plungers to move more freely in its guide bore than the other plunger does, hence the importance of holding the push rod in position while the toggle mechanism is moving from either extreme position to the dead center position at each half cycle of valve operation or during each stroke of the snap action mechanism.

Shortly after the arm 86 has passed through the dead center position of the spring 91, the cam surface 88a strikes the end of the beveled portion 95 with a hammer blow, see Fig. 6, which moves the push rod 75 to the left. It is to be noted that the push rod 75 is in the same position in Figs. 4 and 6 and that by the time the cam surface 88a and the shoulder 95 are in contact, the cam surface 88d has parted from the shoulder 96 to permit movement of the push rod to the left. The toggle arm 86 and associated parts continue to move counterclockwise from the position shown in Fig. 6 due to the combined bias of the springs 91 and 93 until an extreme left hand position is reached corresponding to the initial position of the toggle parts shown at the right in Fig. 4 but not illustrated. Since the springs 91 and 93 do not have the same dead center position, there is no possibility of hesitation or stalling during travel of the arm 86. Furthermore, it should be noted that the increased force of two springs is obtained without increasing the depth of the motor. Also positive operation is assured without having to employ a high spring scale in the case of either spring.

Movement of the push rod 75 to the left drives the valve plunger 48 to the left to open the ports 65 and 66 and to cut off, at the ports 63 and 64 the fluid pressure supply from the inlet port 106 to the piston chamber 37. Concurrently, the valve plunger 49 moves to the left due to the direct connection of the passage 69' with the inlet port 106, and closes the ports 72 and 73, opening the ports 70 and 71, the chamber 74, and the passages 119 and 115' into the piston chamber 47 lying to the right in Fig. 5.

High pressure fluid thus introduced into the chamber 47 returns the piston assembly 31 to its initial position; and, during such movement, the rack teeth drive the shaft 12 clockwise as viewed in Fig. 5. Consequently, the drive pin 82 engages the toggle arm 86 and returns the latter through a dead center position (not shown) with a snap action as before. The cam surface 88b holds the push rod 75 in its left hand position until just before the cam surface 88c strikes with a hammer blow against the shoulder 96, which operation occurs shortly after the dead center position of the spring 91 is passed. The valve plunger 49 is thus forced to its initial position by the push rod 75, and fluid pressure in the guide 45 simultaneously returns the left-hand valve plunger 48 to its initial position.

When the piston assembly 31 moves to the right (Fig. 5) fluid in the piston chamber 47 is discharged through the passages 115' and 119, the chamber 74, the ports 72 and 73, the segmental spaces between the push rod 75 and the guide 46, the toggle-containing recess 28, and the discharge passage 128 to the outlet or discharge port 126 of the body 10. Similarly, as the piston assembly 31 moves to the left, fluid in the piston chamber 37 is discharged through the passages 115 and 114, the chamber 64, the ports 65 and 66, the segmental space between the push rod 75 and the guide 45, the recess 28, and the passage 128 to the outlet or discharge port 126.

By means of the two groups 78 and 79 of the threaded sockets 80 in the plate 76, as shown in Fig. 7 only, various angular movements of the wiper drive arm 14 on opposite sides of a central position of reference can be predetermined merely by selecting the respective openings into which the drive pins 81 and 82 are secured. The groups 78 and 79 may be duplicates with the individual sockets 80 located along radii spaced apart by various dissimilar angles a to f, inclusive, at the right in Fig. 7.

As shown, the angles a to f are so selected in accordance with the distance of the individual sockets 80 from the center of the plate 76 that movement of the drive pins 81 and 82 from socket to socket permits the length of stroke of the drive arm 14 to be changed by equal increments. The angle g determines the minimum wiper blade sweep in the particular arrangement of sockets shown. By placing the drive pins 81 and 82 into noncorresponding sockets 80 in the groups 78 and 79, respectively, the stroke of the drive arm 14 would be caused to be unequal on opposite sides of a reference center plane at right angles to the axis of the power piston centrally intersecting the cylinder sleeve 36, the same as could be effected by an off-center adjustment of the drive arm 14 on the power take-off shaft 12. This affords still more adjustment possibilities for centering the wiper on the desired field of operation because the adjustment increments afforded by changing the drive pins can be different from those afforded either by changing the turned position of the drive plate on the shaft 12 or changing the turned position of the wiper arm on said shaft.

By using a single drive pin on the drive or index plate 76 and appropriately lengthening the rack 30 of the power piston, the mechanism may be designed to obtain over 360° of oscillation on the part of the wiper arm.

We claim:

1. In a fluid operated motor, a reciprocating piston drivingly connected to a rotatable power take-off shaft, aligned duplex sliding valve plungers and cooperating valve means for controlling the operation of said piston, an actuator mechanism for said valve plungers including a longitudinally rigid single push rod movable between the valve plungers and continually in operative contact therewith, said mechanism being movable in opposite directions through a dead center position with a snap action, and circumferentially spaced abutments carried by said shaft and turnable therewith for effecting operating movement of said actuator mechanism.

2. A fluid operated motor comprising a cylinder, a piston reciprocatable within the cylinder, automatically acting duplex reversing valve means for diverting operating fluid alternately to opposite ends of the cylinder, a valve operating member operatively connected with the piston for movement thereby and operatively abutting duplex movable elements of the valve means for moving said elements alternately, said valve means including continually interconnected valve chambers for continually maintaining pressure fluid against the valve elements to maintain said operative abutment.

3. A fluid operated motor comprising a cylinder, a piston reciprocatable within the cylinder, automatically acting reversing valve means for diverting operating fluid alternately to opposite ends of the cylinder, said valve means including oppositely disposed valve plungers and coacting valve sleeves, a valve operating member operatively connected with the piston for movement thereby and operatively abutting the valve plungers for moving said plungers alternately, said valve means including continually interconnected valve chambers respectively associated with the valve plungers for continually maintaining pressure fluid against the valve plungers to cause the plungers to be maintained in operative abutment with the valve operating member at all times.

4. In a fluid operated motor, a reciprocating fluid operable power member and reversing valve means operated thereby to divert fluid alternately into operative contact with the power member, a valve actuating mechanism comprising an oscillating arm driven by the power member and a toggle member pivotally connected to the arm and additionally connected therewith by a snap action spring which assumes a dead center position when the arm and toggle member are in one relative position, and another spring having a fixed support at one end and a movable support carried on the arm at the other end so related to the first spring that the second spring has a dead center position non-coincident with that of the first spring.

5. In a fluid operated motor, a cylinder and a piston reciprocatable therein, a rotary part oscillated by the piston, reversing valve means for diverting operating fluid alternately to opposite ends of the cylinder, a reciprocatable actuating member operatively connected to the valve means, said actuating member having spaced shoulders, an arm operatively associated with said rotary part, a toggle member pivoted to the arm and additionally connected thereto by a snap action spring movable across a dead center position with reference to the arm and toggle member, said toggle member having abutments operative against said shoulders alternately and, additionally, having relatively divergent surfaces maintained by the rotary motion of the arm in cooperative relationship with adjacent surfaces of the actuating member in a manner to hold the latter against premature movement as the toggle member is moved to bring the spring toward dead center position.

6. A fluid operated motor comprising a body having a cylinder and reciprocatable piston therein, a drive shaft in the body transverse to the axis of the cylinder and connected to the piston for oscillating movement of the shaft thereby, a pair of valve chambers aligned on an axis parallel to said cylinder at one end of the drive shaft, said chambers being disposed on opposite sides of the drive shaft axis, a recess in said body adjacent said end of the drive shaft and intersected by said drive shaft axis, snap action toggle mechanism in said recess connected with said end of the shaft for operation thereby, a longitudinally rigid single push rod extending across said recess and cooperating with valve elements in said valve chambers, said toggle mechanism being operatively connected to the push rod for moving the same in opposite directions in synchronism with oscillations of the drive shaft, said valve elements controlling fluid supply alternately to opposite ends of said reciprocatable piston.

7. A fluid motor comprising a cylinder, a piston associated with said cylinder, valve operating means operatively connected to said piston and valve means operatively coupled to said operating means for controlling the flow of fluid to and from said cylinder, said valve means including a valve plunger, means providing a valve sleeve formed with axially spaced ports leading to said cylinder and to atmosphere and within which said valve plunger is slidable, said valve plunger having an effective length in excess of the distance between said ports whereby, with one of said ports uncovered, the other of said ports will be covered.

8. The combination with a fluid motor having a piston and cylinder assembly, a pair of reciprocatable valves for controlling the operation of the piston, a single push rod arranged for operating both said valves and formed with spaced shoulders, a cam between said shoulders arranged for movement to and through a dead center position with a snap action, and means driven by said piston for moving said cam, of means for holding said cam against one of said shoulders substantially until the dead center position is reached.

9. The combination according to claim 8 wherein said shoulders are spaced wider apart than the width of the abutting part of the cam, whereby the cam strikes said other of said shoulders with a hammer blow after the dead center position is passed.

10. A fluid operated motor comprising a body having a cylinder and a reciprocatable piston therein, a drive shaft in the body transverse to the axis of the cylinder and connected to the piston for oscillating movement of the shaft thereby, a pair of valve chambers located on opposite sides of the drive shaft axis and adjacent one end of the drive shaft, a snap-action dead center toggle mechanism connected for operation by said end of the shaft, a single rigid push rod cooperating with valve elements in said valve chambers, said toggle mechanism being operatively connected to the push rod for moving the same in opposite directions in synchronism with oscillations of the drive shaft and said valve elements controlling fluid supply to opposite ends of said piston in the cylinder, said toggle mechanism including a member having a lost motion connection with the push rod whereby the member is operative to deliver a hammer blow on the push rod in each direction of operation thereof after the toggle mechanism passes dead center positions.

11. In a fluid operated motor, a housing, reversible displacement means including reversing valve mechanism arranged for turning a power output shaft with alternate rotary motion, a bearing sleeve supporting the shaft in the housing with a power delivery end of the shaft projecting from the housing, means in the housing supporting the bearing sleeve and containing an annular compressible seal surrounding and in contact with the shaft, respective portions of the sleeve and said means being in confining abutment with opposite sides of the seal axially of the shaft, and a threaded connection between said means and the sleeve whereby relative rotation between the sleeve and said means will adjust the compression on the seal, and means accessible from a point outside of the housing for effecting such relative rotation of the sleeve and said means.

12. A fluid operated motor comprising a cylinder, a piston reciprocatable within said cylinder, a snap action mechanism driven by said piston, a push rod actuated by said snap action mechanism, and valve means including a pair of reciprocating valve plungers and cooperating valve sleeves in which the plungers are moved alternately in one direction by said push rod and in the other direction by fluid pressure force for controlling the flow of fluid to said cylinder.

13. A fluid operated motor comprising means forming pressure chambers and cooperating reciprocatable means, a pair of alternately open and closed valves operable for controlling the flow of fluid to said chambers, valve actuating means extending between and continuously in operative contact with said valves and intermittently operatively connected with the reciprocatable means for operation of each of the valves in one direction thereby, and means for continuously maintaining substantially equal effective fluid pressure force on both valves to move them in directions opposite the direction of operation of the actuating means on said valves.

14. A fluid operated motor comprising means forming a pair of pressure chambers and a reciprocatable member cooperating therewith for operation in opposite directions by fluid admitted alternately to and exhausted from said chambers, a pair of valve members and cooperating ports and passage means alternately controlling admission of such fluid to the chambers and exhaust of fluid therefrom in respective controlling positions of the valve members, means operatively connecting the reciprocatable member to the valve members to move one valve member to o' controlling position and simultaneously enable the other member to move to the other controlling position, said passage means including fluid inlet means en route to the pressure chambers and in motive relationship to respective valve members for actuation of each valve member by such inlet fluid pressure force to said other controlling position.

15. A fluid operated motor comprising means forming a pair of pressure chambers and a reciprocatable member cooperating therewith for operation in opposite directions by fluid admitted alternately to and exhausted from said chambers, a pair of valve members and cooperating ports and passage means alternately controlling admission of such fluid to the chambers and exhaust of fluid therefrom in respective controlling positions of the valve members, means operatively connecting the reciprocatable member to the valve members to move one valve member to fluid exhaust position in respect to the chamber controlled thereby and simultaneously enable the other valve member to move to fluid admitting position in respect to the chamber controlled thereby, said passage means including fluid inlet means in motive relationship to respective valve members for actuation of each member by inlet fluid pressure force to the fluid admitting position.

16. In a fluid motor means forming a pair of pressure chambers and cooperating means caused to be reciprocated when the chambers are supplied alternately with pressure fluid, a pair of valves arranged for simultaneous reciprocation to admit pressure fluid to one chamber and enable exhaust of fluid from the other, a valve operating means operatively interposed between the valves to move them alternately to equivalent fluid controlling positions, a snap action toggle mechanism operatively connected intermittently with said cooperating means and having a part movable between two positions on opposite sides of a dead center position of said part to actuate the valves through the intermediary of the valve operating means, said part having cam surfaces acting alternately to hold the valve operating means against movement until the dead center position of said toggle part is reached on successive cycles.

17. In a fluid operated motor of the type described including a body having pressure chambers and cooperating means caused to be reciprocated by alternate admission and exhaust of pressure fluid to and from the chambers, aligned duplex valve plungers controlling, respectively, pressure fluid inlet passages and exhaust outlet passages leading to and from the respective chambers, said passages communicating with bores in the body which form guides for respective valve plungers, a push rod arranged with opposite ends operatively in contact with respective valve plungers, means operated intermittently by said cooperating means to reciprocate the push rod, said push rod having end portions of non-circular section extending into respective said valve bores and slidably guided thereby for operating the valve plungers and to provide respective exhaust passages from the bores.

18. In a fluid pressure operated motor, pressure chamber forming means and reciprocatable means cooperating therewith, reversing valve means controlling admission and exhaust of pressure fluid in relation to the pressure chamber means, a rotary member operatively connected to the reciprocatable means for oscillation thereby, an arm swingable about the axis of said member and forming one member of a snap action toggle mechanism, a cooperating toggle member pivoted to the arm eccentrically of said axis and a spring connecting the toggle members, a valve operating member reciprocatably mounted for rectilinear movement across the axis of the rotary member and operatingly connected with the valve means, said cooperating toggle member having opposed surfaces engageable alternately with opposed spaced abutment surfaces of the valve operating member at opposite sides of a dead center position of the toggle mechanism and being movable on the eccentric pivot and with the arm in a manner to be maintained in toggle-spring-forced engagement with an abutment surface of the valve operating member until the dead center position of the toggle mechanism is reached.

JOHN H. GALLEY.
LEROY J. CAREY.

REFERENCES CITED

The following references are of record in the file of this patent:

UNITED STATES PATENTS

| Number | Name | Date |
| --- | --- | --- |
| 746,158 | Reed | Dec. 8, 1903 |
| 748,928 | Carlson | Jan. 5, 1904 |
| 864,662 | Lundquist | Aug. 27, 1907 |
| 910,005 | Logar | Jan. 19, 1909 |
| 1,018,961 | Coffield | Feb. 27, 1912 |
| 1,282,841 | Iles | Oct. 29, 1918 |
| 1,567,328 | Oishei | Dec. 29, 1925 |
| 1,709,682 | Moxley | Apr. 16, 1929 |
| 1,849,327 | Hueber | Mar. 15, 1932 |
| 1,910,019 | Kelly | May 23, 1933 |
| 2,144,437 | Wold | Jan. 17, 1939 |
| 2,229,641 | Darling | Jan. 28, 1941 |
| 2,265,306 | Orshansky | Dec. 9, 1941 |
| 2,265,307 | Orshansky | Dec. 9, 1941 |
| 2,270,943 | Freundel, et al. | Jan. 27, 1942 |
| 2,272,033 | Buchmann | Feb. 3, 1942 |
| 2,286,035 | Horton, et al. | June 9, 1942 |